United States Patent
Louch

(10) Patent No.: US 9,645,653 B2
(45) Date of Patent: *May 9, 2017

(54) VARIABLE DEVICE GRAPHICAL USER INTERFACE

(71) Applicant: Apple Inc., Cupertino, CA (US)

(72) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/153,899

(22) Filed: Jan. 13, 2014

(65) Prior Publication Data

US 2014/0129994 A1     May 8, 2014

Related U.S. Application Data

(63) Continuation of application No. 11/937,463, filed on Nov. 8, 2007, now Pat. No. 8,631,358.

(60) Provisional application No. 60/979,042, filed on Oct. 10, 2007.

(51) Int. Cl.
| | |
|---|---|
| *G06F 3/01* | (2006.01) |
| *G06F 1/16* | (2006.01) |
| *G06F 3/0346* | (2013.01) |
| *G06F 3/041* | (2006.01) |
| *G06F 3/0482* | (2013.01) |
| *H04M 1/725* | (2006.01) |
| *G06F 3/0488* | (2013.01) |
| *H04M 1/2745* | (2006.01) |

(52) U.S. Cl.
CPC ............ *G06F 3/017* (2013.01); *G06F 1/1626* (2013.01); *G06F 1/1694* (2013.01); *G06F 3/0346* (2013.01); *G06F 3/0418* (2013.01); *G06F 3/0482* (2013.01); *G06F 3/0488* (2013.01); *H04M 1/72544* (2013.01); *G06F 2200/1637* (2013.01); *H04M 1/274583* (2013.01); *H04M 1/72563* (2013.01); *H04M 2250/10* (2013.01); *H04M 2250/12* (2013.01); *H04M 2250/22* (2013.01)

(58) Field of Classification Search
None
See application file for complete search history.

(56) References Cited

U.S. PATENT DOCUMENTS

| | | |
|---|---|---|
| 5,224,151 A | 6/1993 | Bowen |
| 5,379,057 A | 1/1995 | Clough et al. |
| 5,428,805 A | 6/1995 | Morgan |
| 5,642,131 A | 6/1997 | Pekelney et al. |
| 5,675,362 A | 10/1997 | Clough et al. |
| 5,712,911 A | 1/1998 | Her |
| 6,411,828 B1 | 6/2002 | Lands et al. |
| 6,434,371 B1 | 8/2002 | Claxton |
| 6,449,363 B1 | 9/2002 | Kielsnia |
| 6,677,932 B1 | 1/2004 | Westerman |
| 6,751,446 B1 | 6/2004 | Kim et al. |
| 6,771,768 B2 | 8/2004 | Dietz et al. |
| 6,791,545 B2 * | 9/2004 | Miller et al. ................. 345/440 |
| 6,801,190 B1 | 10/2004 | Robinson et al. |

(Continued)

*Primary Examiner* — Maryam Ipakchi
(74) *Attorney, Agent, or Firm* — Fish & Richardson P.C.

(57) ABSTRACT

Methods, systems, devices, and apparatus, including computer program products, for adjusting a graphical user interface. A motion of a device is detected. A graphical user interface of the device is adjusted in response to the detected motion.

24 Claims, 8 Drawing Sheets

(56) References Cited

U.S. PATENT DOCUMENTS

| | | |
|---|---|---|
| 6,853,850 B2 | 2/2005 | Shim |
| 6,993,366 B2 | 1/2006 | Kim |
| 7,239,900 B2 | 7/2007 | Choi et al. |
| 7,260,422 B2 | 8/2007 | Knoedgen |
| 7,263,373 B2 | 8/2007 | Mattisson |
| 7,400,316 B2 | 7/2008 | Appleyard et al. |
| 7,493,573 B2 | 2/2009 | Wagner |
| 7,499,686 B2 | 3/2009 | Sinclair et al. |
| 7,607,111 B2 | 10/2009 | Vaananen et al. |
| 7,694,231 B2 | 4/2010 | Kocienda et al. |
| 7,696,905 B2 | 4/2010 | Ellenby et al. |
| 7,697,962 B2 | 4/2010 | Craddick et al. |
| 7,774,029 B2 | 8/2010 | Lee et al. |
| 7,920,696 B2 | 4/2011 | Chew |
| 8,065,624 B2 | 11/2011 | Morin et al. |
| 8,099,124 B2 | 1/2012 | Tilley |
| 8,631,358 B2 | 1/2014 | Louch |
| 8,676,224 B2 | 3/2014 | Louch |
| 2003/0095155 A1 | 5/2003 | Johnson |
| 2004/0085340 A1* | 5/2004 | Dimitrova et al. ............ 345/723 |
| 2004/0198332 A1 | 10/2004 | Lunsgaard |
| 2004/0239699 A1* | 12/2004 | Uyttendaele et al. ........ 345/716 |
| 2005/0154798 A1 | 7/2005 | Nurmi |
| 2005/0216867 A1 | 9/2005 | Marvit et al. |
| 2005/0219228 A1 | 10/2005 | Alameh et al. |
| 2005/0268234 A1 | 12/2005 | Rossi et al. |
| 2006/0190836 A1 | 8/2006 | Ling Su et al. |
| 2006/0227114 A1 | 10/2006 | Geaghan |
| 2007/0283264 A1 | 12/2007 | Vau et al. |
| 2008/0034321 A1 | 2/2008 | Griffin |
| 2008/0068336 A1 | 3/2008 | Choi et al. |
| 2008/0117168 A1 | 5/2008 | Liu et al. |
| 2008/0146289 A1 | 6/2008 | Korneluk et al. |
| 2008/0188273 A1 | 8/2008 | You |
| 2008/0220715 A1 | 9/2008 | Sinha et al. |
| 2008/0280640 A1 | 11/2008 | Wedel et al. |
| 2009/0024943 A1 | 1/2009 | Adler et al. |
| 2009/0031257 A1 | 1/2009 | Arneson et al. |
| 2009/0100384 A1 | 4/2009 | Louch |
| 2009/0209293 A1 | 8/2009 | Louch |

* cited by examiner

VARIABLE DEVICE GRAPHICAL USER INTERFACE

RELATED APPLICATIONS

This application is a continuation and claims priority under 35 U.S.C. §120 to U.S. application Ser. No. 11/937,463, titled "Variable Device Graphical User Interface," filed Nov. 8, 2007, which claims the benefit under 35 U.S.C. §119 of U.S. Provisional Application No. 60/979,042, titled "Variable Device Graphical User Interface," filed Oct. 10, 2007, which are incorporated by reference herein in its entirety.

BACKGROUND

The subject matter of this specification relates generally to graphical user interfaces.

Some of today's portable devices include a touch-sensitive display. A graphical user interface can be displayed on the touch-sensitive display. A user of a device can interact with the graphical user interface by making contact with the touch-sensitive display. The device, being a portable device, can also be carried and used by a user while the user is in motion. While the user and the device is in motion, the user's dexterity with respect to the touch-sensitive display can be disrupted by the motion, detracting form the user's experience with the graphical user interface.

SUMMARY

In general, one aspect of the subject matter described in this specification can be embodied in methods that include the actions of detecting a pattern of motion of a device; and adjusting a graphical user interface of the device in response to the detected pattern of motion. Other embodiments of this aspect include corresponding systems, apparatus, devices, computer program products, and computer readable media.

In general, another aspect of the subject matter described in this specification can be embodied in methods that include the actions of detecting a motion of a device; comparing the detected motion to a predetermined signature of motion; and adjusting a graphical user interface of the device based on the comparing. Other embodiments of this aspect include corresponding systems, apparatus, devices, computer program products, and computer readable media.

Particular embodiments of the subject matter described in this specification can be implemented to realize one or more of the following advantages. Loss in accuracy of a user's interactions with a touch-sensitive display of a device or user mistakes with respect to the selection of user interface elements on a touch-sensitive display, due to movement of the user and/or the device, is mitigated. A device user interface can be adjusted to provide better visibility or usability.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example Mobile Device

Figure 1:
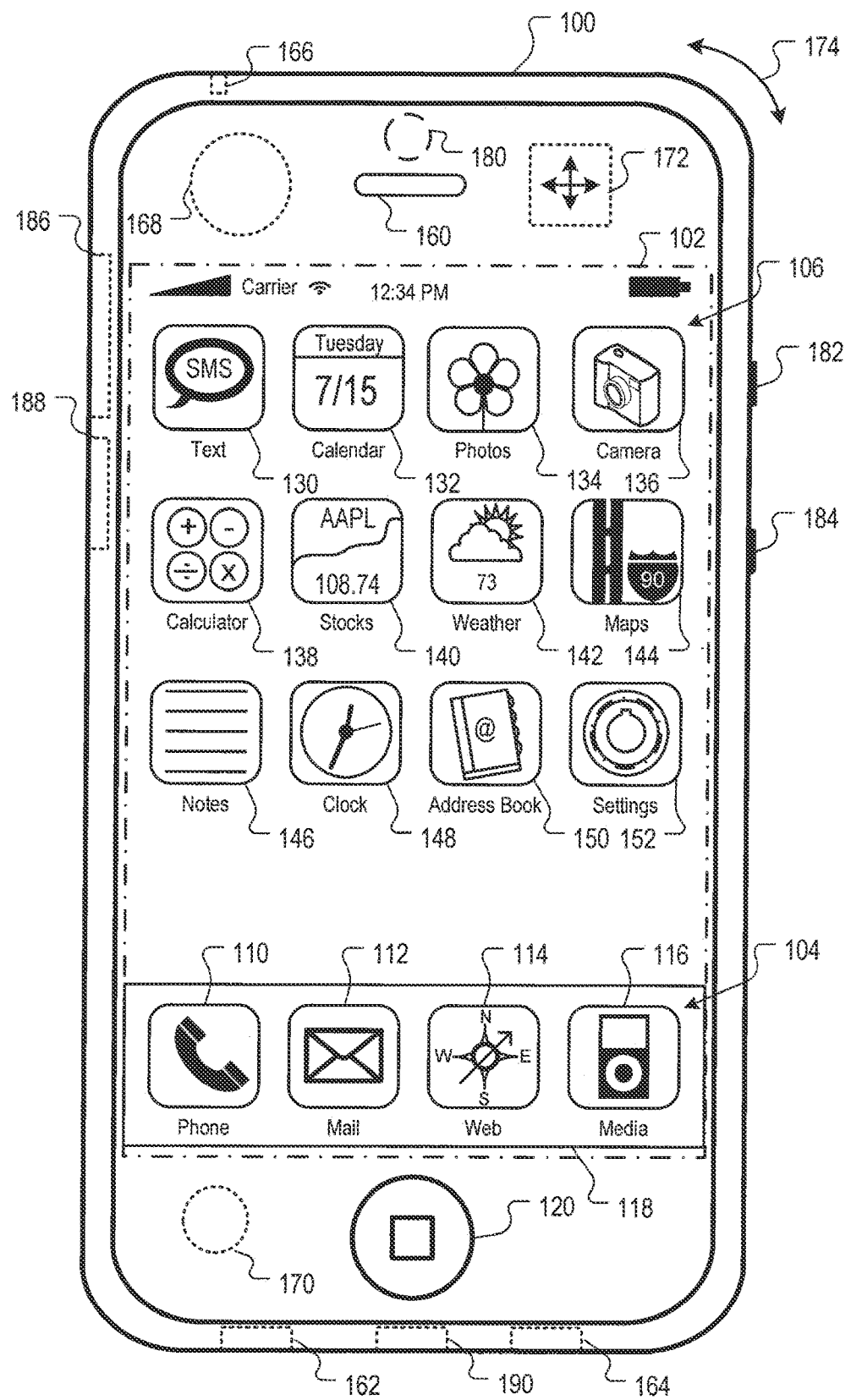
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 includes circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services. In some implementations, the mobile device 100 includes a gyroscopic sensor or other sensors that can be used to detect motion of the device.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device Architecture

Figure 2:
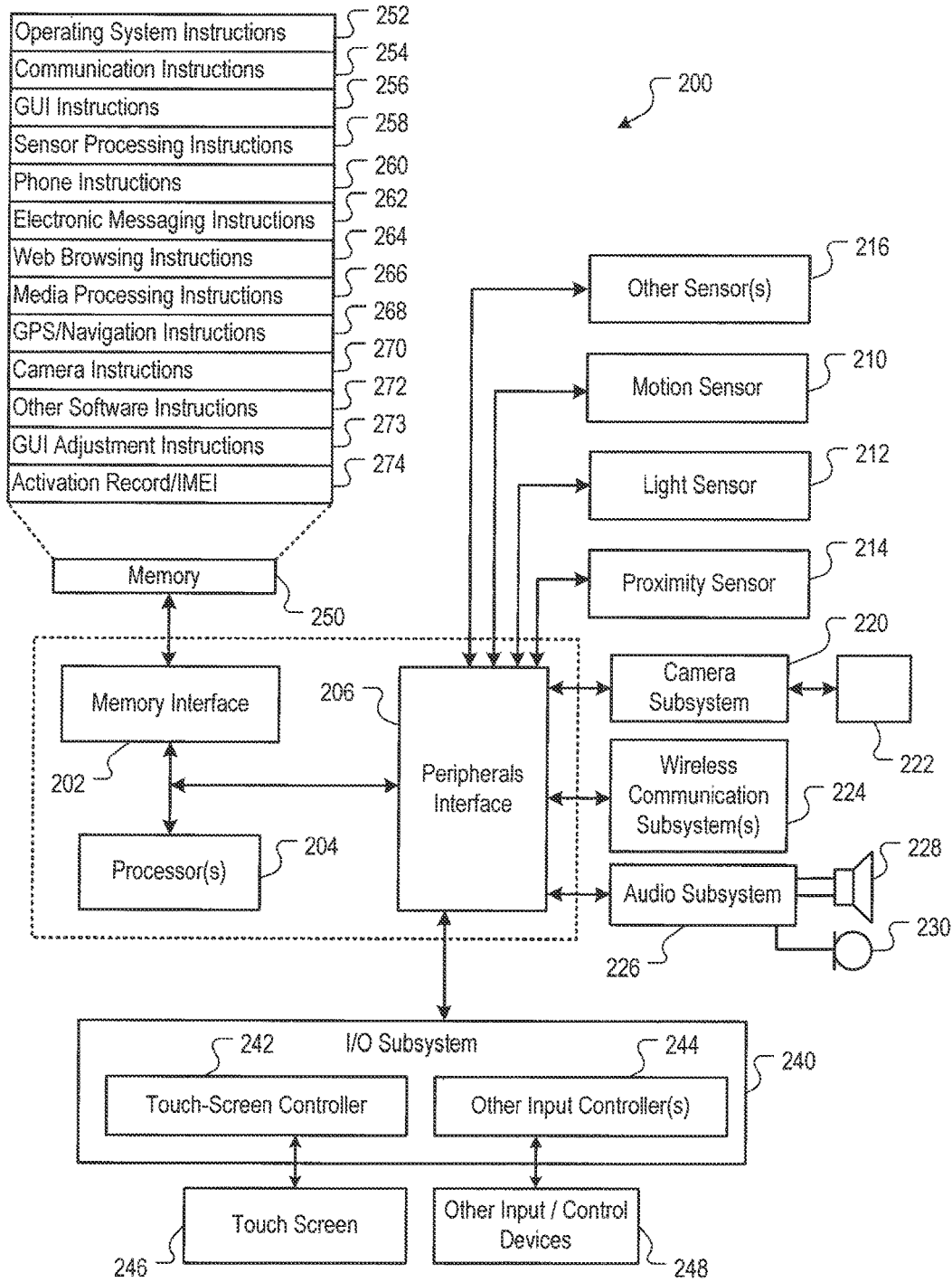
FIG. 2 is a block diagram of an example implementation of the mobile device of FIG. 1.

FIG. 2 is a block diagram 200 of an example implementation of the mobile device 100 of FIG. 1. The mobile device 100 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device 100 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions described with respect to FIG. 1. Other sensors 216 can also be connected to the peripherals interface 206, such as a positioning system (e.g., GPS receiver), a temperature sensor, a biometric sensor, a gyroscope, or other sensing device, to facilitate related functionalities.

A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 100 is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration may disengage a lock of the touch screen 246; and a pressing of the button for a second duration that is longer than the first duration may turn power to the mobile device 100 on or off. The user may be able to customize a functionality of one or more of the buttons. The touch screen 246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 may include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; GUI adjustment instructions 273 to facilitate adjustment of graphical user interfaces and user interface elements in response to sensor data; and/or other software instructions 272 to facilitate other processes and functions. The memory 250 may also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity (IMEI) 274 or similar hardware identifier can also be stored in memory 250.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device 100 may be implemented in hardware and/or in software, including in one or more signal processing and/or application specific integrated circuits.

Figure 3:
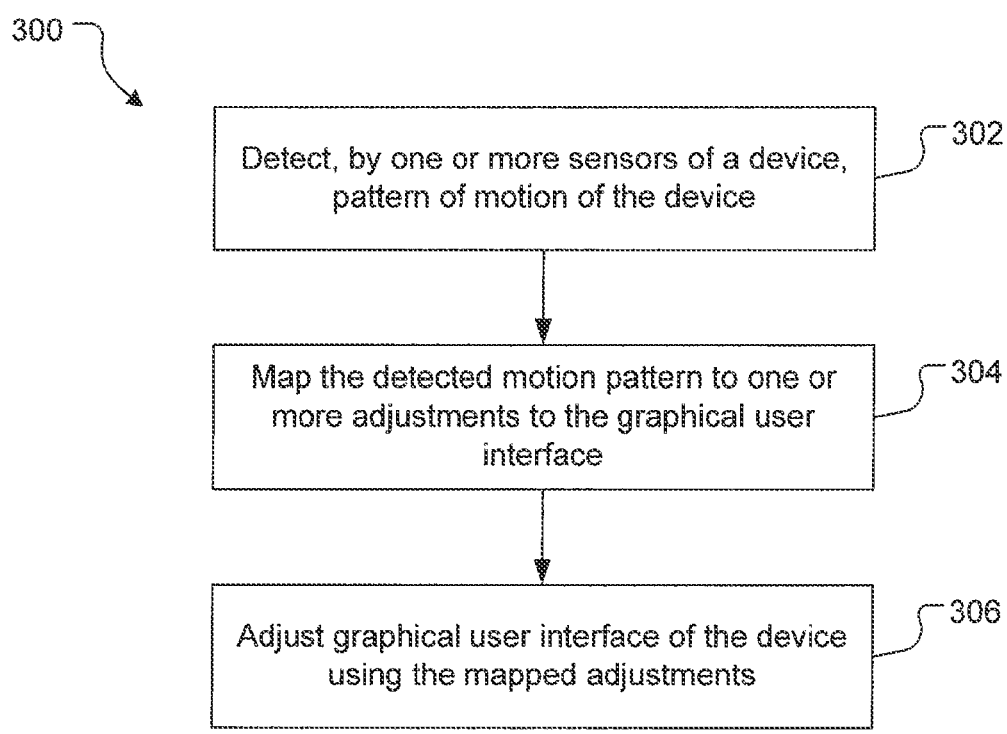
FIG. 3 illustrates an example process for modifying a graphical user interface.

FIG. 3 illustrates an example process 300 for modifying a graphical user interface. For convenience, the process 300 is described below in reference to a device (e.g., device 100, 200) that performs the process.

One or more sensors of the device detect motion (e.g., a pattern of motion associated with pre-determined motion characteristics) of the device (302). One or more sensors on the device 100/200 (e.g., accelerometer 172, motion sensor 210, proximity sensor 214, other sensors 216, a gyroscope) can detect changes in the orientation, acceleration, proximity, etc. of the device and the degrees of the changes in orientation, acceleration, proximity, etc. caused by motion of the device and/or a user carrying the device. These changes in orientation, acceleration, proximity, etc. can be interpreted by the device as motion of the device. If the changes exhibit regularity or predictability or match predetermined criteria, the changes can be interpreted by the device as a pattern of motion. For example, a user of the device 100 can be walking and holding the device for use at the same time. The device 100 can be oscillating (e.g., bouncing up and down) due to the user walking or running. The oscillation can be detected by the sensors of the device. As another example, a user of the device 100 can be a passenger in an automobile and holding the device for use while the automobile is moving. The device 100 can be bouncing up and down as a result, which can be detected by the sensors of the device.

The motion of the device and/or the user can affect the user's accuracy when attempting to interact with a graphical user interface that is displayed on the touch-sensitive display of the device. For example, returning to the above example of the user carrying and using the device while walking, the device can bounce up and down due to motion of the carrying hand and arm while the user is walking. The bouncing can cause the user to touch the touch-sensitive display at an unintended location and select a user interface element that the user did not intend to select.

To address the problem described above, the detected pattern of device motion is mapped to one or more adjustments to the graphical user interface (304), and the graphical user interface of the device is adjusted using the mapped adjustments (306). The pattern of motion detected by the sensors is mapped to one or more adjustments of the graphical user interface of the device, including user interface elements in the graphical user interface, based on one or more criteria related to the detected pattern of motion. The criteria can include the type of the detected motion and the magnitude of the motion. The mapped adjustments are applied to the graphical user interface. The adjustments can mitigate the loss in accuracy in the user's attempts to select user interface elements in the graphical user interface by touching the touch-sensitive display. In some implementations, the mapping and adjustments can be made by the sensor processing instructions 258 and the GUI adjustment instructions 273, respectively.

In some implementations, the device 100 can include a user-settable option to toggle the feature of adjustments to the graphical user interface based on detected device motion. That is, if the feature is disabled, no adjustments are made to the graphical user interface based on detected motion. If the feature is enabled, adjustments can be made to the graphical user interface based on detected motion.

In some implementations, the adjustment includes resizing of user interface elements and their corresponding touch areas (e.g., the area on the touch-sensitive display where a touch on the display selects the user interface element) in the graphical user interface. For example, rows corresponding to entries in a list interface (e.g., a list of contacts in a contact list where a row corresponds to a contact in the list, a list of media items where a row corresponds to a media item in the list, etc.) can be enlarged by increasing the height of each of the entry rows. The touch area corresponding to each one of the enlarged rows is also enlarged as a result. The enlarging gives the user a larger target touch area for a row, lessening the likelihood of unintentional selections. An example of the enlarging of rows corresponding to entries in a list is described below in reference to FIGS. 4A-4B.

As another example, the display objects 104 or 106 can be resized. One or more of the display objects 104, 106 and their corresponding touch areas can be enlarged, increasing the target touch area for each of the resized display objects. An example of the enlarging of the display objects is described below in reference to FIGS. 5A-5B.

In some implementations, the adjustment includes a shift of the graphical user interface or of user interface elements in the graphical user interface. The graphical user interface/user interface elements can be shifted vertically and/or horizontally. In some implementations, the shift is in a direction opposite to the detected motion of the device; the shift attempts to relocate a user interface element to a position on the touch-sensitive display that the user is likely to touch if the user intended to select the user interface element in view of the motion of the device. An example of the shifting of user interface elements is described below in reference to FIG. 6.

In some implementations, the adjustment includes changing a sensitivity level of the touch-sensitive display. For example, the sensitivity level of the touch-sensitive display can be decreased. Decreasing the sensitivity level of the touch-sensitive display increases the pressure needed for a touch on the touch-sensitivity display to be recognized by the device. The increase in required pressure to select a user interface element can lead the user to be more deliberate in their attempts to touch the touch-sensitive display to select user interface elements.

In some implementations, the adjustment includes adjusting the target touch area of a user interface element based on an angle at which the device is being held. For example, if the device is held at an angle deviating from a default angle and which is more parallel than perpendicular with the ground, the target touch area of a user interface element can be enlarged. Optionally, the target touch area can also be skewed to account for the angle.

In some implementations, the adjustment includes enlarging some target touch areas and/or user interface elements relative to others. For example, a fisheye effect can be imposed on the target touch areas and the user interface to enlarge the elements and target areas nearer to the center of the "fisheye" relative to elements and target areas nearer to the periphery. The center of the "fisheye" need not be the center of the display; the center of the "fisheye" can be positioned over user interface elements in the user interface that are selected more often or are considered more important.

While several types of adjustments are described above, it should be appreciated that the adjustment to the graphical user interface made by the device can include any combination of the described types of adjustments and other suitable types of adjustments.

In some implementations, the amount of an adjustment is a predefined amount or percentage. For example, a user interface element can be resized by a predetermined amount of pixels or a predetermined percentage of the original size of the user interface element. In some other implementations, the amount of an adjustment is based on the amount of detected motion, amount of detected acceleration, amount of change in orientation from a starting position, or the like. For example, if the amount of acceleration from rest is small, the amount of the resizing or shifting of a user interface element is small as well. In some implementations, the amount of adjustment can be based on user preferences. For example, the user can configure (in a device options and settings interface, for example) a maximum allowable amount (e.g., a percentage) for a type of adjustment.

In some implementations, the adjustment includes interrupting actions initiated by the user with additional confirmation steps. Rather than shifting or resizing user interface elements by some amount, for example, the device can add confirmation dialogs or question interfaces to the user interface flow for particular actions and optionally also shift or resize user interface elements by a smaller amount. As an example, if a user attempts to make a call on device 100 while walking and a bouncing motion of the device is detected, the device 100 can display a confirmation dialog box displaying the contact or phone number to be dialed and asking the user to confirm that the contact or number that is displayed is the one to be called. The confirmation dialog box can have relatively large target touch areas for "Yes" and "No" buttons for the user to select to confirm or decline the call.

In some implementations, the device "learns" particular characteristics of the motion of the device and the user's interactions with the device in light of the motion of the device. For example, the device can measure magnitudes of the motion of the device due to the user's motions. As another example, the device can detect the user's mistakes in the selection of user interface elements (e.g., the user unintentionally selects a display object 104 or 106 and then quickly exits from the application corresponding to the selected display object). From the user mistakes, the device can look for patterns in the user's mistakes (e.g., user is consistently touching one side of the display but intended to touch the other side, the user is missing their intended targets in a consistent manner, etc.). From this learned information, the device can predict where the user will touch the touch-sensitive display while the device in motion and make the adjustments to the graphical user interface based on the predictions.

In some implementations, the device detects a motion of the device and compares the detected motion to one or more predetermined signatures of motion. The device can store multiple signatures of motion (e.g., a signature of a bouncing motion while the user is walking, a signature of a change in orientation, etc.) and, for each signature, corresponding adjustments to the graphical user interface. If the detected motion matches one of the predetermined signatures, the device adjusts the graphical user interface using the adjustments corresponding to the matching signature. In some other implementations, the device compares the detected motion and compares the detected motion to the signatures. The device uses the comparison to determine which signature is closest to the detected motion and applies the graphical user interface adjustments corresponding to the signature determined to be closest to the detected motion.

Figure 4A:
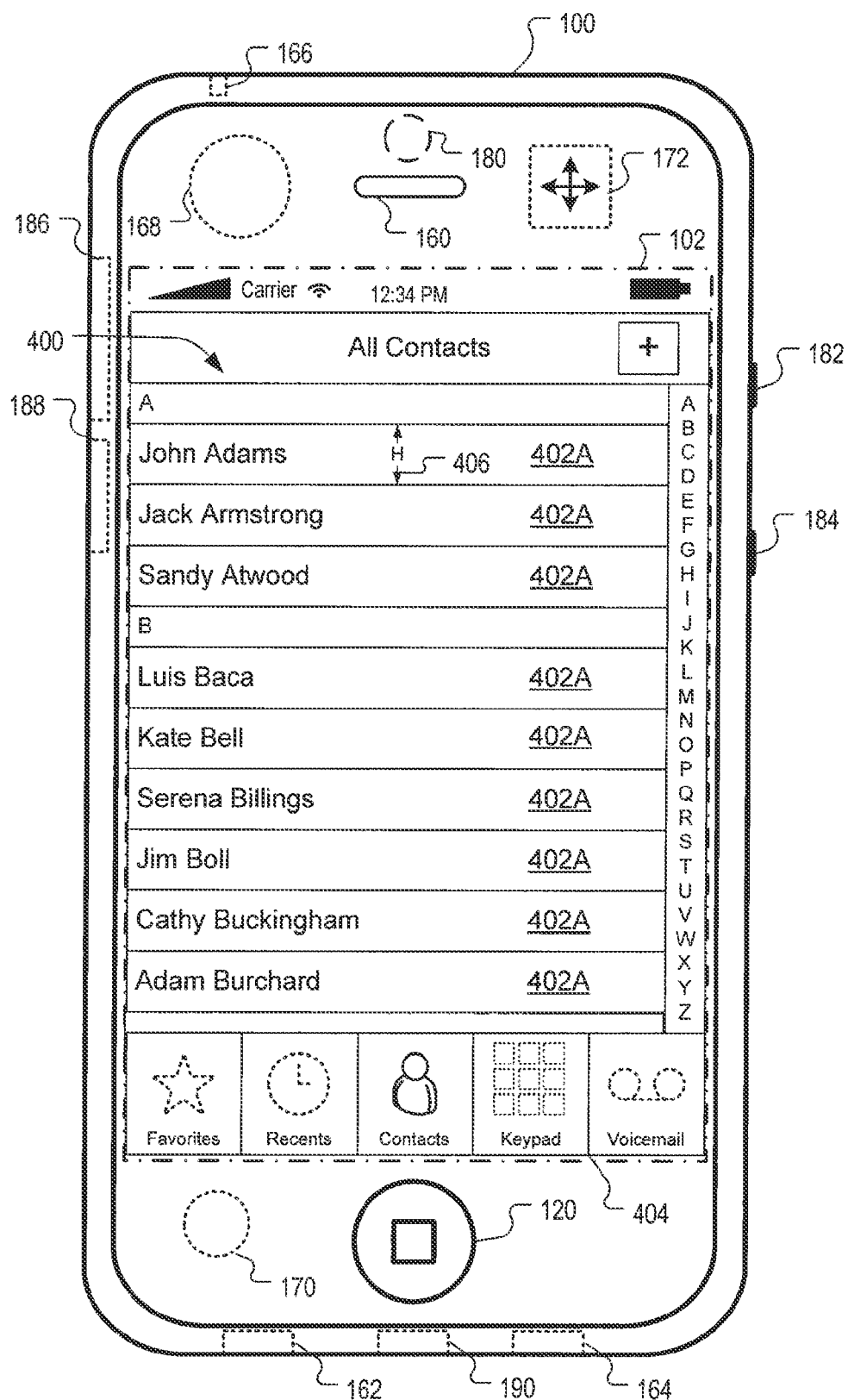
FIGS. 4A and 4B illustrate an example contact list user interface on an example mobile device.
Figure 4B:
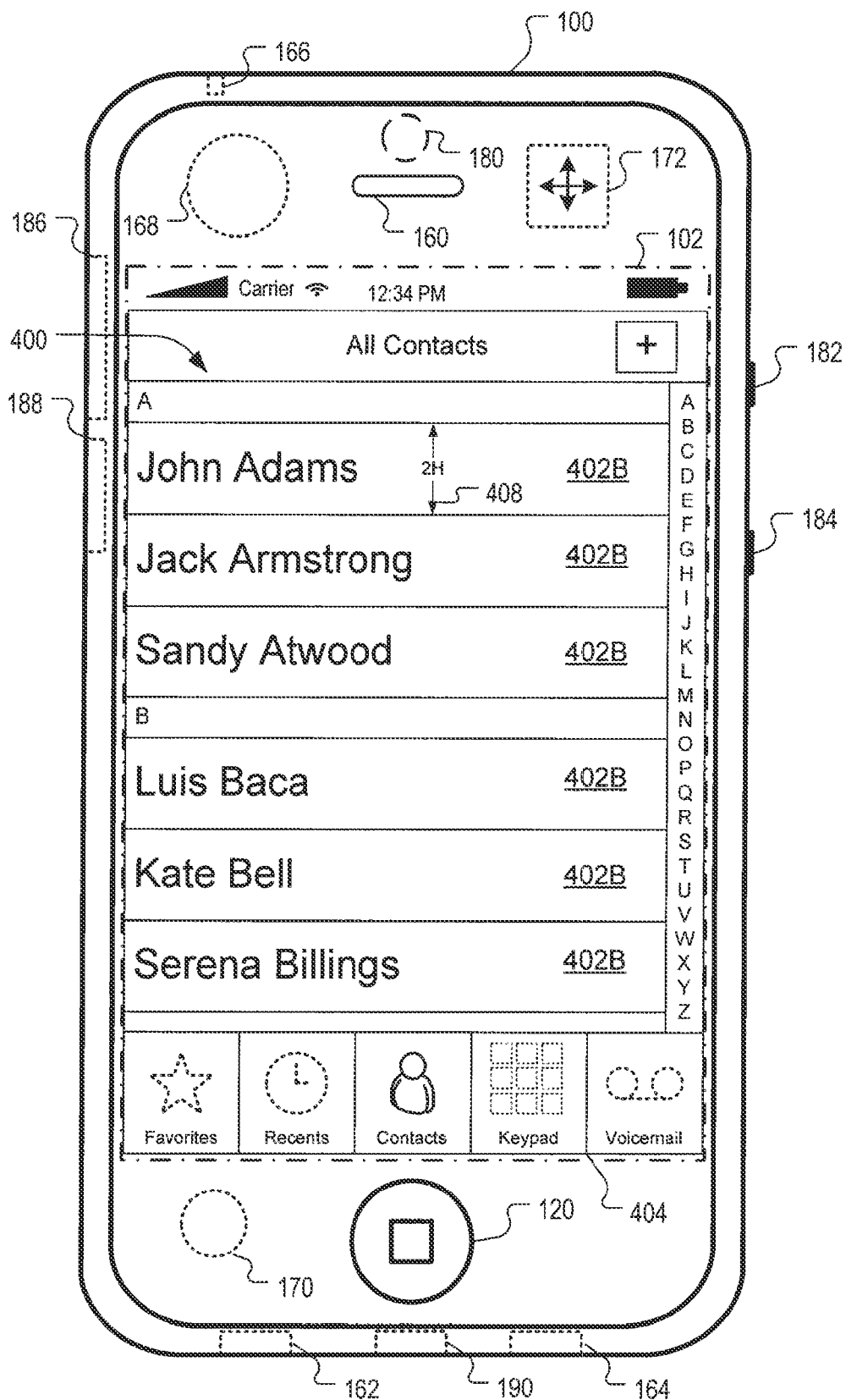

FIGS. 4A and 4B illustrate an example contact list user interface on an example mobile device. FIG. 4A illustrates device 100 with a contact list 400 displayed on the display 102. The contact list application 400 includes one or more contacts 402A, with a row in the contact list 400 for each contact 402A. A row 402A can have a height H 406. A user can touch the display 102 on the area of a contact 402A to display the contact information for that contact. For example, if the user wishes to view the contact information for "John Adams," the user touches the display over the area of the row for the contact "John Adams." A toolbar 404 with buttons for various features related to phone functionality can also be displayed. Example features related to phone functionality can include a list of favorite contacts, a contact list, a log of recent calls, a keypad, and voicemail.

While the device is moving, the motion of the device can be detected. The device can change the size of the rows of the contacts in the contact list application 400 to give the user a larger target area for each contact. For example, the height of a row can be increased. As shown in FIG. 4B, the contact list application 400 has contacts 402B which are located in rows whose heights have been increased to 2×H 408. This gives the user a larger touch area with which to select a contact. In some implementations, the height of the toolbar 404 can be increased as well.

Figure 5A:
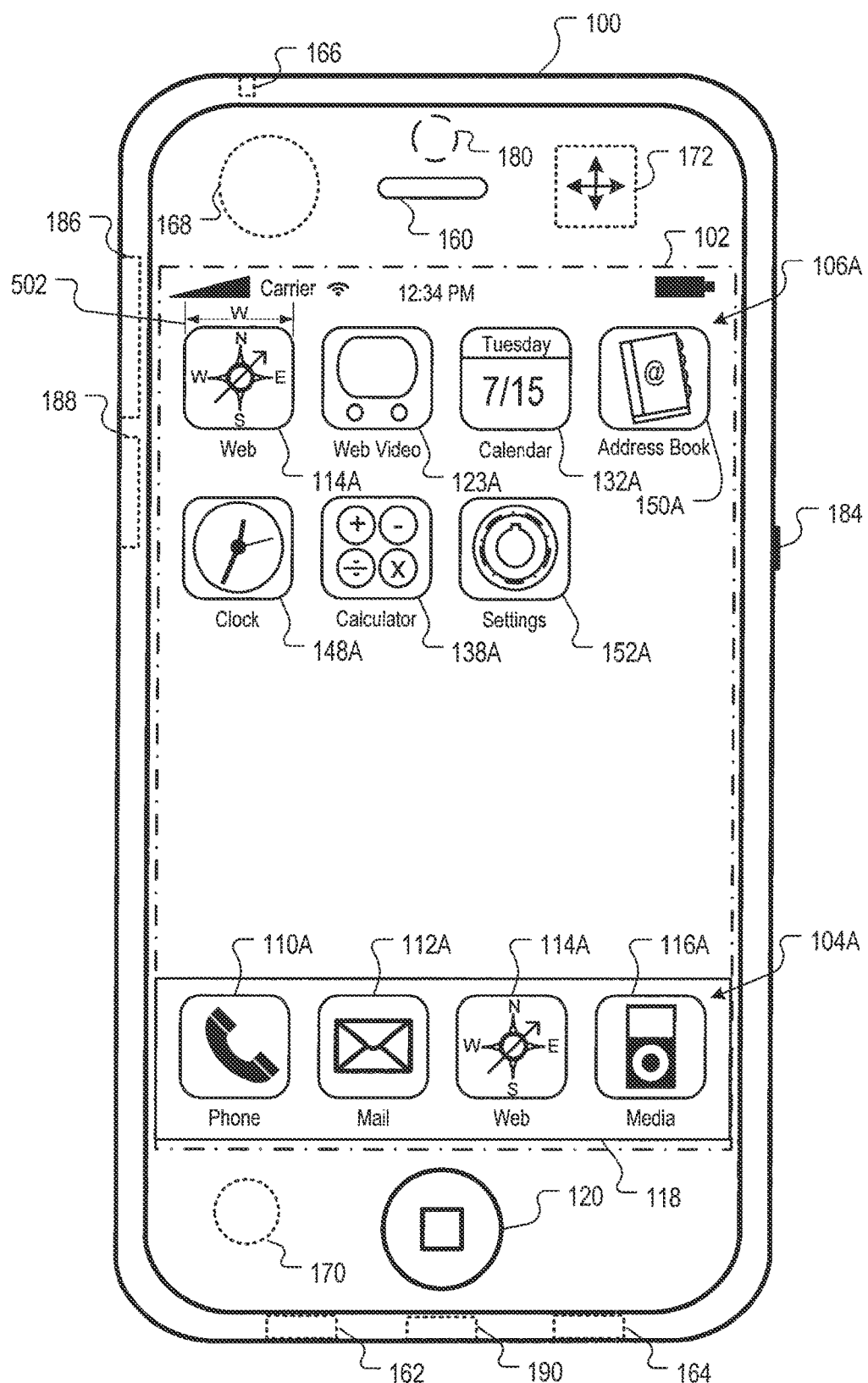
FIGS. 5A and 5B illustrate an example user interface of a device.
Figure 5B:
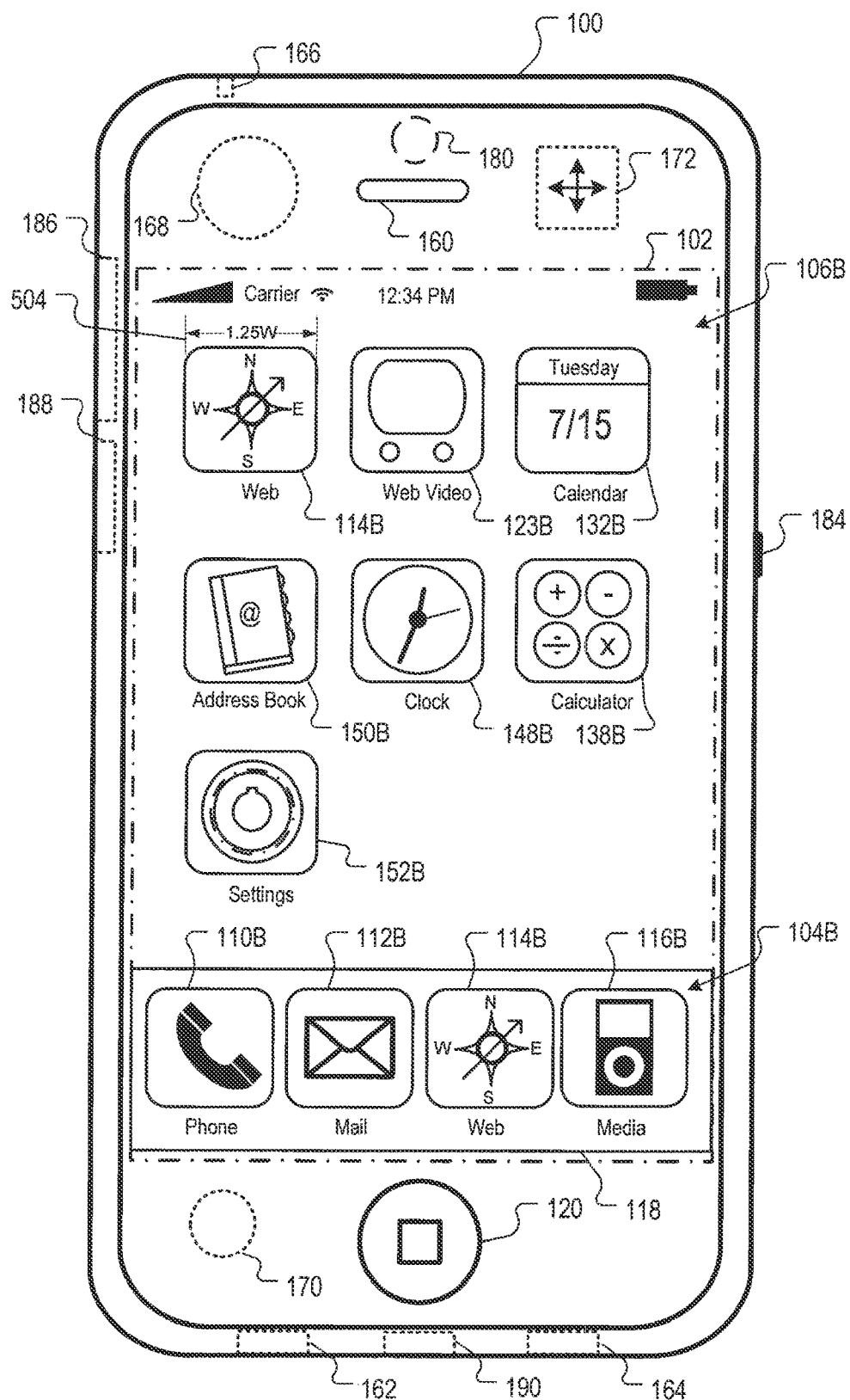

FIGS. 5A and 5B illustrate an example user interface of a device. In FIG. 5A, the device 101 is displaying display objects 104A (objects 124A, 125A, 134A, 126A) and 106A (objects 114A, 123A, 132A, 150A, 148A, 138A, 152A) at their original sizes on the touch-sensitive display 102. A display object 104A or 106A can have, for example, a width W 502. The objects 104A and 106A can be resized in response to motion of the device that is detected by one or more sensors on the device. FIG. 5B shows the device 101 with the resized objects 104B (objects 124B, 125B, 134B, 126B) and 106B (objects 114B, 123B, 132B, 150B, 148B, 138B, 152B). The resized objects 104B, 106B are larger (e.g., have a width of 1.25×W 504) than the original size objects 104A and 106A and has larger target touch areas than the original size objects 104A and 106A. This gives the user a larger touch area with which to select a display object 104B or 106B.

Figure 6:
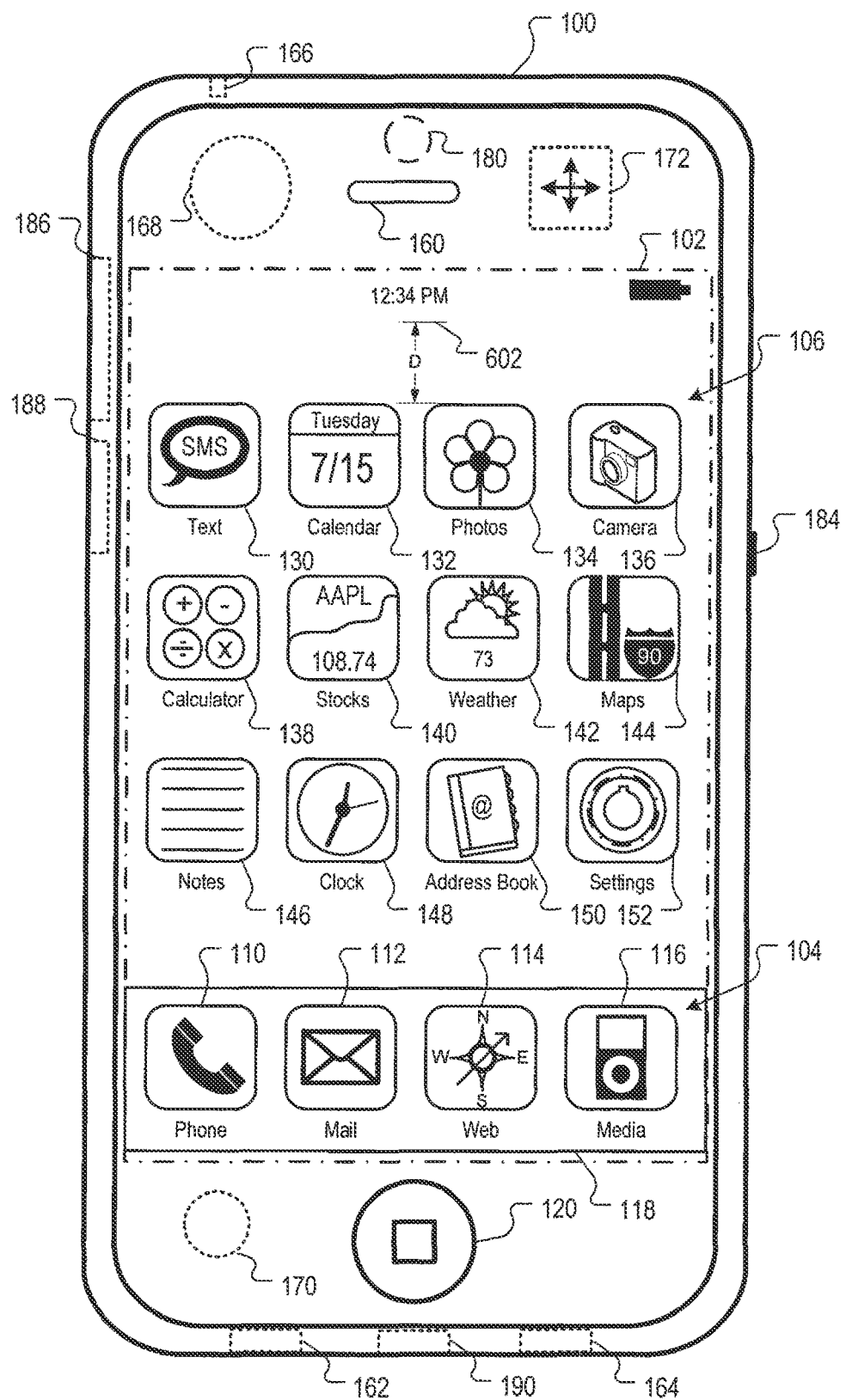
FIG. 6 illustrates another example user interface of a device.

FIG. 6 illustrates device 101 with a graphical user interface that includes display objects 106. In FIG. 6, the display objects 106 are shifted, compared to the display objects 106 in FIG. 1B, vertically downward by a distance D 602 toward the bottom of the graphical user interface. The shift moves the target touch areas of the display objects 106 to a different position. In some implementations, the new position is a predetermined distance from the original position. In some other implementations, the new position is determined by the device based on a prediction of where the user will touch the touch-sensitive display if the user wanted to select the user interface element while the device is in motion.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
    detecting a pattern of motion of a device;
    comparing the pattern of motion to a predetermined signature of motion that includes user mistakes;
    determining that the predetermined signature of motion is closest among stored signatures of motion to the detected pattern of motion, wherein the predetermined signature of motion is stored in association with data representing a corresponding set of graphical user interface adjustments specific to the predetermined pattern of motion, wherein the data representing the corresponding set of graphical user interface adjustments is usable to adapt a graphical user interface to one or more patterns of motion corresponding to the predetermined signature of motion;

retrieving the data representing the corresponding set of graphical user interface adjustments; and applying the corresponding set of graphical user interface adjustments to a graphical user interface of the device to present an adjusted graphical user interface in response to user mistakes in user interactions with the adjusted graphical user interface based on the detected pattern of motion of the device.

2. The method of claim 1, wherein detecting includes detecting a least one of acceleration, proximity, or orientation.

3. The method of claim 2, wherein the detection uses at least one of an accelerometer, a gyroscope, or a proximity sensor.

4. The method of claim 1, wherein adjusting the graphical user interface comprises resizing one or more elements in the graphical user interface.

5. The method of claim 1, wherein adjusting the graphical user interface comprises shifting one or more user interface elements of the graphical user interface.

6. The method of claim 1, wherein adjusting the graphical user interface comprises resizing an area of touch sensitivity on a touch sensitive display of the device corresponding to an element in the graphical user interface.

7. The method of claim 1, wherein adjusting the graphical user interface comprises adjusting a sensitivity level of a touch sensitive display of the device.

8. The method of claim 1, further comprising:
detecting an angular position of the device; and
adjusting a graphical user interface of the device based on the detected angular position.

9. A device, comprising:
a touch-sensitive display;
one or more sensors;
one or more processors configured to:
detect a pattern of motion of a device using the one or more sensors;
compare the pattern of motion to a predetermined signature of motion that includes user mistakes;
determine that the predetermined signature of motion is closest among stored signatures of motion to the detected pattern of motion, wherein the predetermined signature of motion is stored in association with data representing a corresponding set of graphical user interface adjustments specific to the predetermined pattern of motion, wherein the data representing the corresponding set of graphical user interface adjustments is usable to adapt a graphical user interface to one or more patterns of motion corresponding to the predetermined signature of motion;
retrieve the data representing the corresponding set of graphical user interface adjustments; and
apply the corresponding set of graphical user interface adjustments to a graphical user interface presented through the touch-sensitive display to present an adjusted graphical user interface in response to user mistakes in user interactions with the adjusted graphical user interface based on the detected pattern of motion of the device.

10. The device of claim 9, further comprising the pattern of motion includes at least one of acceleration, proximity, or orientation.

11. The device of claim 9, wherein the sensors comprise at least one of an accelerometer, a gyroscope, or a proximity sensor.

12. The device of claim 9, wherein the adjustment includes resizing one or more elements in the graphical user interface.

13. The device of claim 9, wherein the adjustment includes shifting one or more user interface elements of the graphical user interface.

14. The device of claim 9, wherein the adjustment includes resizing an area of touch sensitivity on a touch-sensitive display corresponding to an element in the graphical user interface.

15. The device of claim 9, wherein the adjustment includes adjusting a sensitivity level of the touch sensitive display.

16. The device of claim 9, further comprising instructions to:
detect an angular position of the device; and
adjust the graphical user interface of the device based on the detected angular position.

17. A non-transitory computer program product operable to cause a device to perform operations comprising:
detect a pattern of motion of a device using one or more sensors;
compare the pattern of motion to a predetermined signature of motion that includes user mistakes;
determine that the predetermined signature of motion is closest among stored signatures of motion to the detected pattern of motion, wherein the predetermined signature of motion is stored in association with data representing a corresponding set of graphical user interface adjustments specific to the predetermined pattern of motion, wherein the data representing the corresponding set of graphical user interface adjustments is usable to adapt a graphical user interface to one or more patterns of motion corresponding to the predetermined signature of motion;
retrieve the data representing the corresponding set of graphical user interface adjustments; and
apply the corresponding set of graphical user interface adjustments to a graphical user interface to present an adjusted graphical user interface in response to user mistakes in user interactions with the adjusted graphical user interface based on the detected pattern of motion of the device.

18. The computer program product of claim 17, further operable to cause the device to detect one or more of acceleration, proximity, or orientation.

19. The computer program product of claim 17, further operable to cause the device to perform operations comprising resizing one or more elements in the graphical user interface to present the adjusted graphical user interface.

20. The computer program product of claim 17, further operable to cause the device to perform operations comprising shifting one or more user interface elements of the graphical user interface to present the adjusted graphical user interface.

21. The computer program product of claim 17, further operable to cause the device to perform operations comprising resizing an area of touch sensitivity on the touch sensitive display corresponding to an element in the graphical user interface to present the adjusted graphical user interface.

22. The computer program product of claim 17, further operable to cause the device to perform operations comprising adjusting a sensitivity level of the touch sensitive display.

23. The computer program product of claim 17, further operable to cause the device to perform operations comprising:
   detecting an angular position of the device; and
   adjusting a graphical user interface of the device based on the detected angular position.

24. The method of claim 1, wherein adapting a graphical user interface to one or more patterns of motion corresponding to the predetermined signature of motion comprises modifying at least some user interface elements of the graphical user interface while a user is interacting with the graphical user interface concurrently with detected motion of a corresponding pattern.

\* \* \* \* \*